Dec. 27, 1932.  R. J. L. MOINEAU  1,892,217
GEAR MECHANISM
Filed April 27, 1931  5 Sheets-Sheet 1

RENÉ JOSEPH LOUIS MOINEAU
INVENTOR;
By Otto Munk
his Attorney.

Dec. 27, 1932. R. J. L. MOINEAU 1,892,217
GEAR MECHANISM
Filed April 27, 1931   5 Sheets-Sheet 2

RENÉ JOSEPH LOUIS MOINEAU
INVENTOR;
By
Attorney.

Dec. 27, 1932.  R. J. L. MOINEAU  1,892,217
GEAR MECHANISM
Filed April 27, 1931   5 Sheets-Sheet 3

RENÉ JOSEPH LOUIS MOINEAU
INVENTOR:
By
his Attorney.

Dec. 27, 1932.  R. J. L. MOINEAU  1,892,217
GEAR MECHANISM
Filed April 27, 1931   5 Sheets-Sheet 4

RENÉ JOSEPH LOUIS MOINEAU
INVENTOR;
By Otto Munk
his Attorney.

Dec. 27, 1932.  R. J. L. MOINEAU  1,892,217
GEAR MECHANISM
Filed April 27, 1931   5 Sheets-Sheet 5

René Joseph Louis Moineau
INVENTOR;
By (signature)
his Attorney.

Patented Dec. 27, 1932

1,892,217

UNITED STATES PATENT OFFICE

RENÉ JOSEPH LOUIS MOINEAU, OF PARIS, FRANCE

GEAR MECHANISM

Application filed April 27, 1931, Serial No. 533,187, and in France May 13, 1930.

My invention relates to a novel gear mechanism adapted to be used as a pump, a prime mover, or a transmission means which essentially consists of two helical members, disposed within one another, the outer member having one helical thread or tooth more than the inner member, every thread or tooth of said inner member having such an outline as to be constantly in contact with the outer member in any transverse section. The ratio of the pitches of the helices of the two members should be equal to the ratio of the numbers of threads of said members if the pitches are constant. If the pitches are not constant, the ratio of the elementary pitches of the two helices, in any cross-section, should be constantly equal to the ratio of the numbers of threads.

Further characteristics of the invention will appear from the following description, with reference to the appended drawings, given merely by way of example, and in which.

Figure 3:
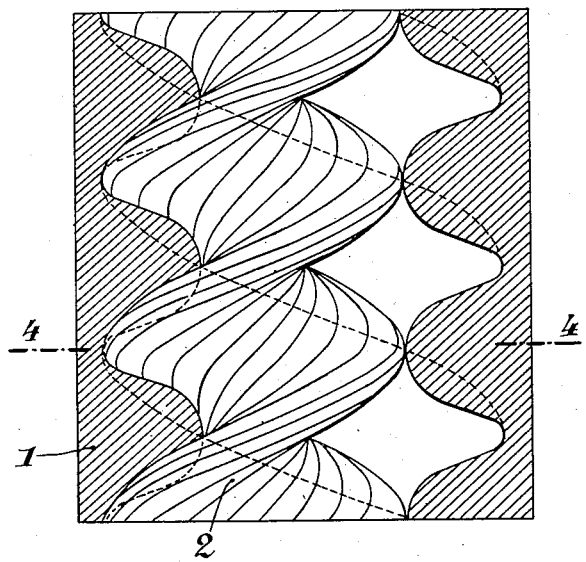
Fig. 3 is a view similar to Fig. 1 showing another embodiment.
Figure 4:
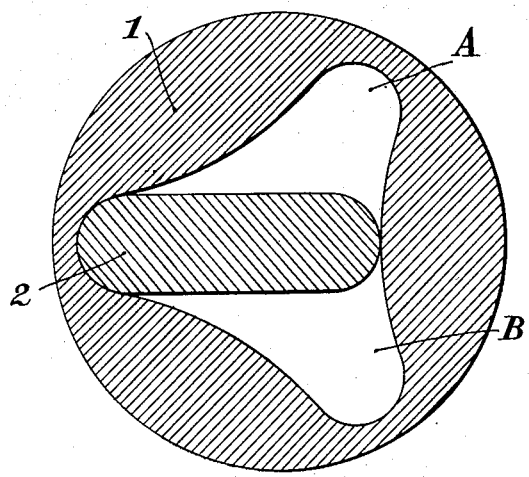
Fig. 4 is a horizontal section on the line 4—4 of Fig. 3.

Referring to the drawings, the device according to my invention essentially comprises two helical gear members 1 and 2 disposed within one another and rotatable about their longitudinal axes, which are parallel to, but spaced from, one another. The outer member 1 has one thread more than the inner member 2. In the example shown in Figs. 1 and 2, member 1 has four threads and member 2 has three threads. In the example of Figs. 3 and 4, members 1 and 2 have three threads and two threads, respectively. It should be understood that the two gear members might have any numbers of thread whatever, provided that the difference between said numbers be equal to one.

Inner member 2 has such an outline that every thread or tooth thereof constantly engages outer member 1, and this in every cross-section of the device as explained hereunder.

Moreover, the pitches of the helices of the two members are in the same ratio as the numbers of teeth or threads.

A very great number of gear teeth profiles comply with both requirements (1—in any cross-section a difference equal to one between the numbers of teeth of the two members; 2—every tooth or thread of the inner helical member being permanently in contact with the outer member).

I will now describe by way of example, some of those profiles, these being classifiable in two families.

In a first family the profiles consist of arcs of epicycloids and hypocycloids generated by the rolling on corresponding internally tangent base circles of generating circles, having the same diameter, equal to the distance between the centres of the respective base circles.

Any number of teeth or threads may be used, up from the internal profile having one tooth or thread, and the outer profile two teeth or threads.

Figure 7:
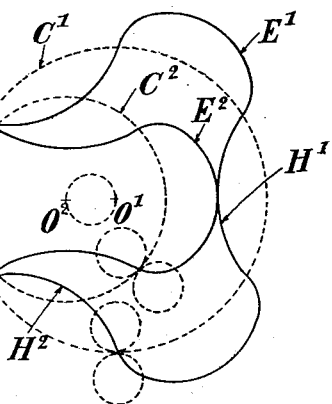
Fig. 7 shows two mating profiles for the threads consisting of epicycloids and hypocycloids.

By way of example, Fig. 7 shows two mating profiles adapted to be used in a device according to my invention. The outer profile has three teeth, the inner profile two teeth. $O^1$ and $O^2$ are the centres of the base or pitch circles $C^1$ and $C^2$, which are tangent to each other internally; the ratio of their radii is 3 to 2; the distance between the centres of the respective base circles $O^1$ $O^2$ is equal to one third the greater radius $C^1$ and to one half the smaller radius $C^2$. The generating circles of the epicycloids $E^1$, $E^2$ . . . and of the hypocycloids $H^1$, $H^2$ roll respectively on the outside and on the inside of pitch circles $C^1$ and $C^2$ and have a diameter equal to distance between the centres of the respective base circles $O^1$ $O^2$.

A second family of curves may be obtained as follows: Each of the outer and inner profiles is formed of hypocycloids, generated by the rolling inside the corresponding pitch circle of generating circles having a radius equal to the distance between the centres of the respective base circles of the pitch circles, that is to say to the distance between the longitudinal axes of the two helical members 1 and 2.

Figure 8:
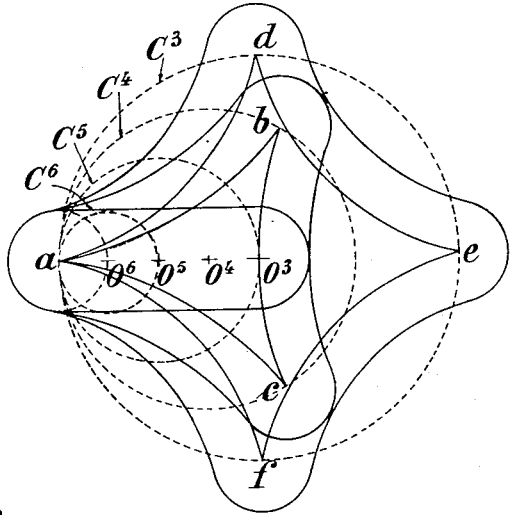
Fig. 8 shows a family of mating curves consisting of hypocycloids and hypocycloid envelopes.

By way of example, Fig. 8 shows a family of such profiles, each of which can be considered as the outer profile relatively to a profile having one tooth less, or the inner profile relatively to a profile having one tooth more. Fig. 8 shows the four pitch circles $C^3$, $C^4$, $C^5$, $C^6$ of profiles having one, two, three and four teeth, respectively, their centres being $O^3$, $O^4$, $O^5$, $O^6$, respectively, and the ratio of their radii varying as the ratio of the number of teeth. The hypocycloids are generated by generating circles, the radius of which is equal to the constant distance between the centres of the respective base circles $O^3$ $O^4$=$O^4$ $O^5$=$O^5$ $O^6$ . . . . The curves thus obtained are: for the four teeth profile, the curve $a\ d\ e\ f$; for the three teeth profile, the curve $a\ b\ c$; for the two teeth profile, the straight line $a\ O^3$; for the one tooth profile, the curve is reduced to a point $a$.

Instead of such profiles, use may be made of the outer envelopes of circles, having the same radius for the outer profile as for the inner profile, and rolling on said profiles. In Fig. 8 these envelopes are obtained by the rolling of circles having for example a diameter equal to the distance between the centres of the respective base circles $O^3$—$O^4$, $O^4$—$O^5$ . . . .

If instead of the cycloidal profiles, one employs the aforesaid envelopes, the single tooth profile is a circle whose centre is $a$. The inner gear member having such profile would rotate about $O^6$. The two teeth profile is a symmetrical curve $C^6$, and the gear member having such profile would rotate about $O^5$, and so on. Many other profiles might be imagined, which would more or less approximate to the preceding ones, or would be deduced from one another through methods similar to those above explained.

Each gear member is obtained by winding the corresponding profile in a helix fulfilling the condition concerning the pitches of the helices (that is said pitches will be in the same ratio as the numbers of threads or teeth of the two profiles).

Figure 1:
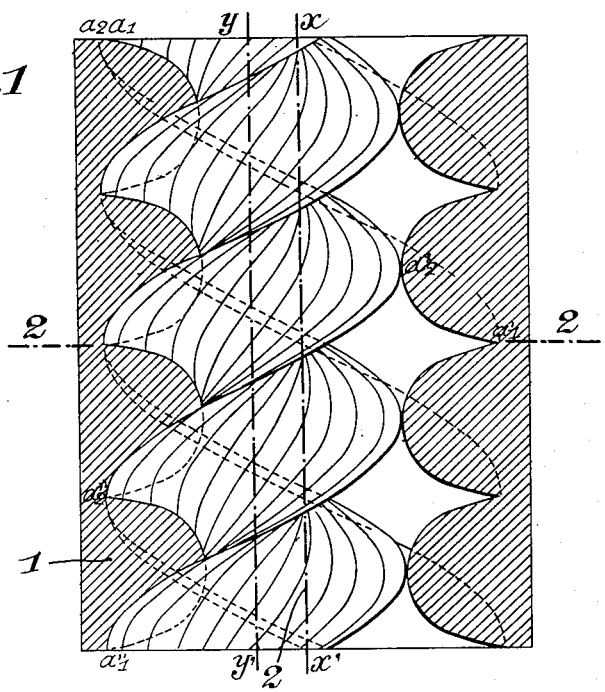
Fig. 1 shows a device according to my invention, the outer helical member being shown in axial section, and the inner member in elevation.
Figure 2:
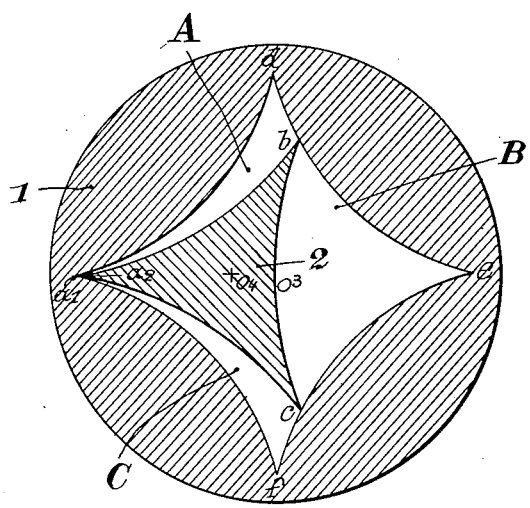
Fig. 2 is a horizontal section on the line 2—2 of Fig. 1.

In the example of Figs. 1 and 2, use is made of the hypocycloids $a\ b\ c$, $a\ d\ e\ f$ of Fig. 8. The formation of the gear member is as follows: for member 1, point $O^3$ of profile $a_1\ d\ e\ f$, is caused to describe the axis $x\ x'$ whose trace is $0^3$, while point $a_1$ of profile $a_1\ d\ e\ f$ is caused to describe the helix $a_1\ a'_1\ a''_1$ (Fig. 1); for member 2, point $0^4$ of profile $a_2\ b\ c$ is caused to describe the axis $y\ y'$ whose trace is $0^4$, while point $a_2$ of profile $a_2\ b\ c$ is caused to describe the helix $a_2\ a'_2\ a''_2$. The ratio of the pitches $$\frac{a_1\ a''_1}{a_2\ a''_2} = \frac{4}{3};$$

$x\ x'$ and $y\ y'$ are respectively the axes of rotation of gear members 1 and 2.

In the examples of Figs. 3 and 4, use is made in the same manner of the envelopes deduced from the hypocycloids.

Due to the shape of the gear members 1 and 2, there is produced between them empty spaces, the length of which is equal to the pitch of the outer gear member. In the example of Figs. 1 and 2, any cross section intersects three or four such spaces (depending upon the relative positions of the gear members) the areas of which increase and decrease pediodically during the relative displacement of the two helical gear members 1 and 2. In Fig. 2, three such spaces are shown at A, B and C. In the example of Figs. 3 and 4, any cross-section intersects two or three such spaces. Two of them, A and B are shown in Fig. 4. As the inner member 2 is caused to roll relatively to and within outer member 1, it will be seen that such empty spaces will move (without being deformed, if the pitch is constant) with a helical motion, along the inner wall of the outer gear member.

If the device is used as a pump, or the like, there must be at least one partition in any one of the empty spaces above mentioned, in order to avoid the free communication between one end of the system and the opposite end. It will be understood that, for this purpose, the length of the outer gear member must be at least equal to the pitch of the corresponding helix, since the maximum length of one space is equal to said pitch.

Obviously, the inner and outer members may consist of a pluraltiy of elements, for example of cylindrical elements of small height or flat discs stacked upon each other, stepped with respect to one another in a helical arrangement, etc.

Figure 5:
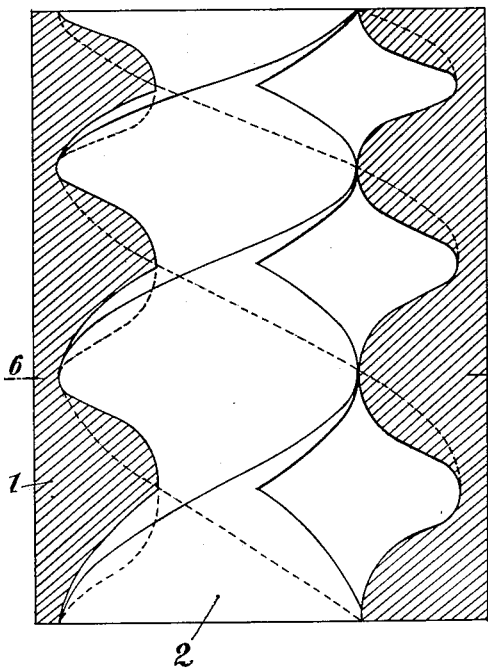
Fig. 5 is a view similar to Fig. 3, in the case of helices having variable pitches.
Figure 6:
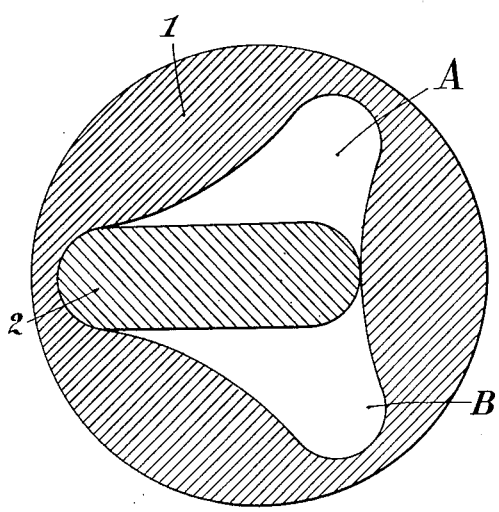
Fig. 6 is a cross-section on the line 6—6 of Fig. 5.

In the examples above described, the pitches of the helices are constant and, although the areas of the cross-sections of the spaces A B C by any given transverse plane are variable during the rotation, the volumes of such spaces remain constant during the rotation. However, the pitches of the helices may vary along the longitudinal axes of the gear members; for instance they may progressively increase or decrease, as shown in Figs. 5 and 6. In that case, for any given cross-section of the profiles, the elementary pitches (or inclinations) of the outer and inner helices must remain in the same ratio as the numbers of teeth or threads of said profiles.

It will be seen that, in contradistinction with what may occur when the helices have constant pitches, members 1 and 2 cannot slide with respect to one another along their longitudinal axes. Furthermore, during the movement of rotation, the spaces A, B . . . have a variable volume while moving along the system. Such feature may be used, in the case of compressible fluids for instance, for obtaining compression or expansion in accordance with a pre-determined law. If the helices of the outer helical member comprise more than one complete turn, the device according to my invention may serve to compress or expand any fluid whatever, without necessitating the provision of check-valves. In that case, the pressure increases or decreases only beyond the first turn of the helices of the outer gear member.

The diameters of the pitch circles of helical members 1 and 2 may also vary along the axes of said members, in a uniform manner. In that case the longitudinal axes of members 1 and 2 will intersect each other.

The diameters of the pitch circles of helical members 1 and 2 may also vary along the axes of said members, in a uniform manner. In that case the longitudinal axes of members 1 and 2 will intersect each other.

Figure 13:
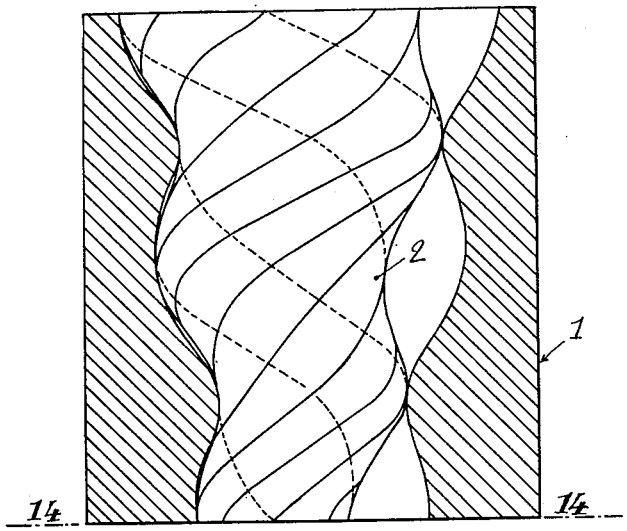
Fig. 13 is a longitudinal section of a device provided with one conical thread.
Figure 14:
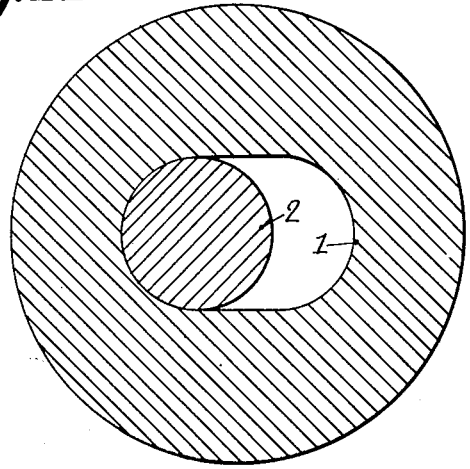
Fig. 14 is a cross section on the line 14—14 of Fig. 13.

In the case of Fig. 8, the diameter of the generating circles that roll on the hypocycloids may also be varied in a uniform or non uniform manner; in this case, the two axes remain parallel. In Figs. 13 and 14, I have shown two members 1 and 2, provided with one conical shaped thread.

In Figs. 9 to 12, I have diagrammatically exemplified mechanisms embodying the above described gears. Of course these devices are shown merely by way of example. My invention would not be changed at all if any other arrangement were used, provided it comprises two gears according to my invention adapted to roll within one another.

Figure 9:
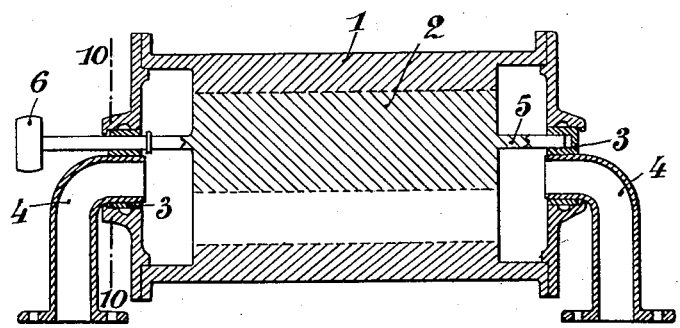
Fig. 9 is a vertical diagrammatic sectional view of a mechanical device according to my invention.
Figure 10:
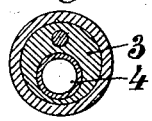
Fig. 10 is a vertical partial section on the line 10—10 of Fig. 9.

In the example of Fig. 9, the two gear members 1 and 2 constructed for example in the manner illustrated in Fig. 1, are indicated for the sake of clearness, by cylinders whose diameters are equal to those of the pitch circles. Two bearing members 3 are secured to hollow brackets 4 which also form fluid inlet and outlet conduits, respectively. The axis of the cylindrical periphery of bearing 3 coincides with the axis of outer gear member 1 and at least one of them is pierced through so as to afford a passage for a shaft 5 which carries the inner helical gear member 2 and a driving pulley 6.

If pulley 6 is rotated, inner member 2 is caused to rotate about the axis of shaft 5 and thus drives outer member 1 at a speed equal to $\frac{2}{3}$ d the speed of member 2. According to the direction of rotation of member 2, a fluid supplied from one of the conduits 4 flows from one end to the other of the pump.

The outer member 1 may also be driven directly through a belt passing around it whereby member 2 would be driven through member 1. With such an arrangement, shaft 5 need not extend through bearing 3.

If a fluid under pressure is fed through one of the conduits, for example 4, the apparatus may operate as a prime mover, the other conduit serving for the exhaust of expanded fluid. The power may be derived either from pulley 6, or from the periphery of outer gear member 1.

Figure 11:
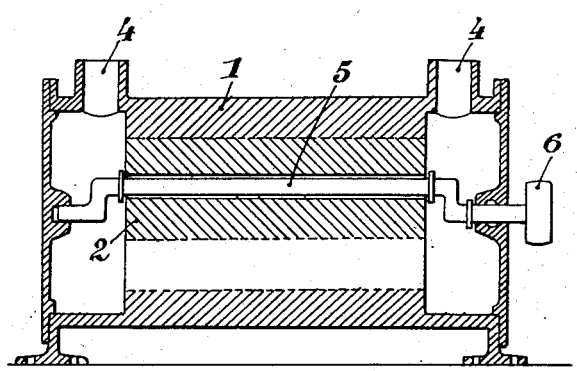
Fig. 11 is a vertical longitudinal section of a modification.

In the example of Fig. 11, the outer gear member 1 is held stationary and the inner member 2 is caused to roll therein by rotating about a crank shaft 5, adapted to rotate about the axis of outer member 1. Pulley 6 receiving external power, inner member 2 will roll within outer member 1 secured to a support 7. According to the direction of rotation, the fluid is conveyed from one end of the pump to the other one.

If a fluid under pressure is fed through one of the conduits 4, the apparatus acts as a prime mover, the other conduit serving for the exhaust, and the power can be derived from pulley 6.

Figure 12:
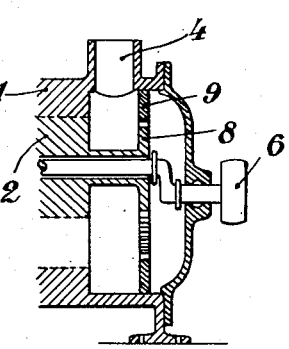
Fig. 12 is a partial vertical cross-section of a further modification.

Fig. 12 shows a modification of Fig. 11 in which the device is also reversible. In this modification, the inner gear member 2 is provided with a pinion 8, meshing with an internal gear 9, carried by the outer gear member 1. Pinion 8 and gear 9 may have any suitable numbers of teeth, but the ratio of said numbers must be equal to the ratio of the teeth or threads of the helical gears, so that the relative position of members 1 and 2 will be positively controlled by said pinion and said gear. This arrangement avoids wear and tear of the helical members, which may thus be adjusted so as to be nearly in contact with each other.

Of course, the device above described may also be used as an ordinary transmission gearing. In such applications, it is chiefly advantageous for providing speed reductions such as $$\frac{1}{2}, \frac{2}{3}, \frac{3}{4}, \ldots$$

with the minimum number of teeth (one and two, two and three, and so on). Figs. 1 and 2 may be considered as showing such a gearing, affording a speed ratio equal to $\frac{3}{4}$ or $\frac{2}{3}$ as the case may be. The condition relating to the length of the gear members no longer exists, but the driving is smoother as said length is greater. Preferably, such length should amount to at least a fraction of the pitch of a gear member equal to said pitch divided by the number of threads or teeth of said member.

While I have disclosed what I deem to be the preferred embodiments of my invention, it should be well understood that I do not wish to be limited thereto, as there might be changes made in the arrangement, disposition and shape of the parts as comprehended within the scope of the appended claims.

Having now described my invention what I claim as new and desire to secure by Letters Patent is:

1. A device of the type described comprising two helical gear members disposed within one another, the outer member having one helical thread more than the other, and the two members being so arranged and shaped that every thread of the inner member is constantly in contact with the outer member in any transverse section, the pitches of the helices of the two members being, in any transverse section in the same ratio as the numbers of threads of said members respectively.

2. A device according to claim 1 whose length is at least equal to the pitch of the helix of the outer member.

3. A device according to claim 1, in which the cross-sections of the helical members consist of mating hypocycloids whose generating circles have a radius equal to the distance between the longitudinal axes of the two helical members.

4. A device according to claim 1, in which the cross-sections of the helical members consist of the outer envelopes of two families of circles rolling along mating hypocycloids whose generating circles have a radius equal to the distance between the longitudinal axes of the two helical members.

5. A device according to claim 1 in which the axes of the two helical members are parallel.

6. A device according to claim 1, in which the axes of the two helical members intersect each other.

7. A device according to claim 1 in which the gear members have a generally conical shape.

8. A device of the type described, comprising an integral unit formed of a plurality of similar thin toothed cylindrical elements disposed in a stepped relation along a common axis, so that their corresponding points form helices winding about said axis, a second unit formed of a plurality of similar thin toothed elements disposed in a similar manner, adapted to cooperate with the first mentioned unit, the elements of the first mentioned unit being disposed within the second mentioned unit, each element of the second unit having one tooth more than the cooperating element of the first unit, all the teeth of the elements of the first unit being in constant contact with the corresponding surrounding element and the pitches of the helices passing through corresponding points of two adjacent elements for the two units being in a ratio equal to that of the numbers of teeth in said units, in each transverse plane.

9. A device according to claim 1, further comprising a pinion rigid with the inner helical member, an inner gear integral with the outer helical member, adapted to mesh with said pinion, the numbers of teeth of said pinion and of said gear being in the same ratio as the numbers of threads of the two helical members.

10. A device as claimed in claim 1, wherein the pitches of both gear members vary progressively from one point to another, while remaining constantly in the same ratio in any given transverse plane.

In testimony whereof I have signed my name to this specification.

RENÉ JOSEPH LOUIS MOINEAU.